2 Sheets—Sheet I.

J. BOURDIN.
DEVICE FOR TRANSMITTING POWER TO SEWING-MACHINES.

No. 170,933. Patented Dec. 14, 1875.

Witnesses:
John Robey
Geo. T. Smallwood Jr.

Jules Bourdin
Inventor
by John J. Halsted
his Atty.

N. PETERS, PHOTO-LITHOGRAPHER, WASHINGTON, D. C.

2 Sheets—Sheet 2.

J. BOURDIN.
DEVICE FOR TRANSMITTING POWER TO SEWING-MACHINES.
No. 170,933. Patented Dec. 14, 1875.

Witnesses.
Geo. T. Smallwood, Jr.
John Robey, Jr.

Inventor
Jules Bourdin
By John J. Halsted
Atty.

UNITED STATES PATENT OFFICE.

JULES BOURDIN, OF PARIS, FRANCE.

IMPROVEMENT IN DEVICES FOR TRANSMITTING POWER TO SEWING-MACHINES.

Specification forming part of Letters Patent No. 170,933, dated December 14, 1875; application filed February 20, 1875.

*To all whom it may concern:*

Be it known that I, JULES BOURDIN, of Paris, in the Republic of France, civil engineer, have invented an Improved Device for Transmitting Motive Power to Sewing-Machines, of which the following is a specification:

The object of this invention is the transmission to sewing-machines of the motive power produced by the motion of the feet, and thereby to change the alternate movement of one or several treadles to a continuous circular movement, in such a manner as to obviate the dead-points and increase the work of the machine.

Figure 1:
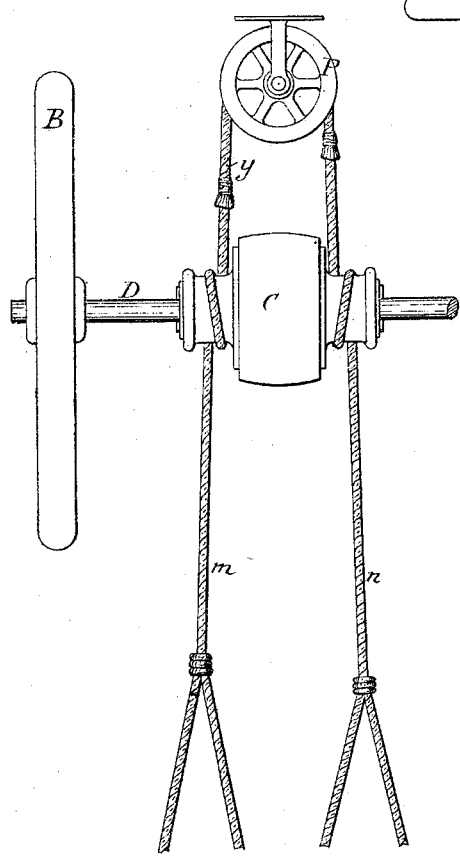
Figure 3:
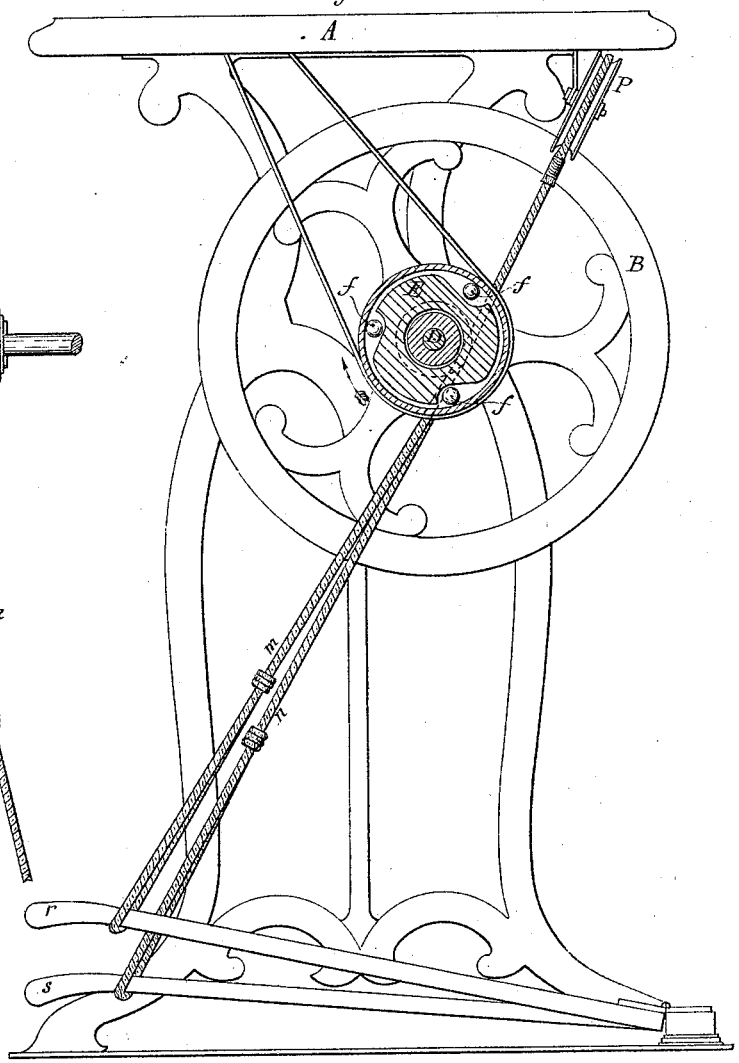
Figure 2:
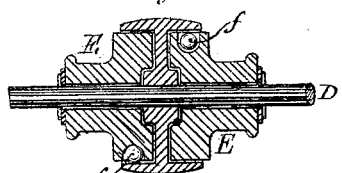

In the accompanying drawing, Figure 1 is an elevation, Fig. 2 a section, and Fig. 3 a side view, partly in section, showing my invention applied to a sewing-machine with two treadles.

A is the stand of the machine; B, the fly-wheel; D, the fly-wheel spindle, and $r$ and $s$ the two treadles. The spindle D is made straight instead of being cranked, and carries a pulley, C, which serves to communicate motion to the various parts of the sewing-machine. In the interior of this pulley C are the parts E, which are loose on the spindle D, and are hollowed out, as shown, to receive two, three, or more india-rubber balls. Each part E has a shank, $e'$, for its driving-cord. It will be seen from the form of the recesses, Fig. 3, that the balls, in turning in the direction of the arrow, will press against the felly of the pulley, and will force it to turn in that direction, while if the balls turn in the opposite direction the pulley will not move. The parts E are provided with two projections, over which wind the cords $m$ and $n$, which pass from the treadles $r$ and $s$ to a return-pulley, P, placed on the stand. The two cords are connected round this pulley by a tube or cord, $y$, of india-rubber, the elasticity of which renders it unnecessary to raise one foot before the other again touches the ground, the maximum amount of work being attained under these conditions.

Figure 4:
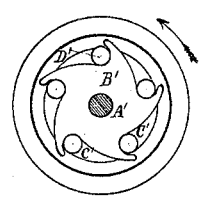
Figure 5:
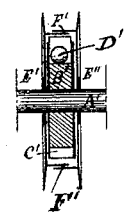

Fig. 4 shows an elevation of the arrangement in which the piece which is provided with notches or hollowed-out parts for the balls is fixed on the shaft or spindle. Fig. 5 is a section of the same.

$A'$ is the spindle or shaft. $B'$ is a piece in cast-iron, formed with the notches $C'$ $C'$ for the balls $D'$ $D'$. On each side of the piece $B'$ I fix two cheeks of a pulley, $E'$ $E''$, joined together like a box, as seen at $F'$. These cheeks are loose on the spindle $A'$. The action is the same as in the arrangement hereinbefore described. When the pulley has to be placed on a vertical shaft or spindle the lower cheek should be made conical, in such a manner as to force the balls to fall naturally on the periphery, so that they may be drawn along by the interior surface of the felly.

It will be seen that the working of the treadles will always cause the rotation of the pulley in the same direction. Instead of two treadles, as hereinbefore described, I can employ one treadle only, in which case I apply a bow to each of the pieces E, one end of the bow being united to any suitable point of the oscillating treadle.

What I claim is—

The described construction of devices for transmitting motion to a sewing-machine, consisting of the disconnected parts E of the pulley, separated by the part C, each part E having a shank, $e'$, for its driving-cord, and cavities for the elastic balls $f$, combined with the two treadles and the cord and return pulley or pulleys P.

J. BOURDIN.

Witnesses:
L. SODDIN,
H. N. DUFRENE.